March 20, 1928.

C. T. JENKINS

UDDER PROTECTOR

Filed May 9, 1927

Caroline T. Jenkins,
INVENTOR

BY Victor J. Evans
ATTORNEY.

March 20, 1928.
C. T. JENKINS
1,663,408
UDDER PROTECTOR
Filed May 9, 1927
2 Sheets-Sheet 2
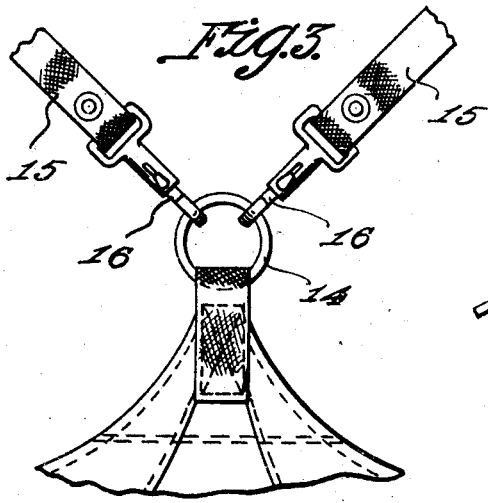
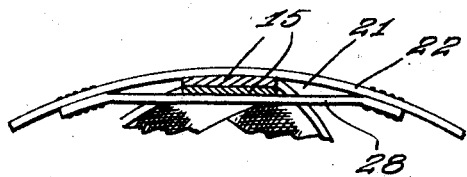
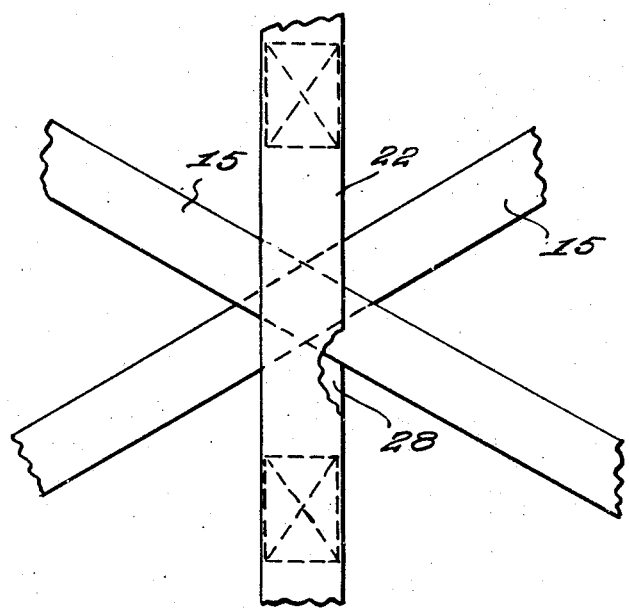
Caroline T. Jenkins,
INVENTOR
BY Victor J. Evans
ATTORNEY Patented Mar. 20, 1928.

1,663,408

UNITED STATES PATENT OFFICE.

CAROLYN T. JENKINS, OF DUNBAR, NEBRASKA.

UDDER PROTECTOR.

Application filed May 9, 1927. Serial No. 190,111.

This invention contemplates the provision of an udder protector, capable of being adjusted to properly cover the udder in a manner to prevent the latter from being scratched, or flies or other insects from biting the tits, which insects frequently carry infections or diseases into the milk duct.

Another object of the invention resides in the novel construction of harness supporting means for the protector, whereby the animal may have perfect freedom of movement and at the same time not subject the protector to any pulls or strains.

In addition to the foregoing, the invention has been designed to keep the udder warm in winter, therefore permitting a greater flow of milk, keeps the udder clean and protects it from being scratched by weeds or wires, prevents cow sucking herself, and also provides an efficient calf weaner.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 3 is a fragmentary detail view showing how one end of the protector is supported.

Figure 4 is a sectional view showing how the straps in Figure 3 are capable of sliding movements through one of the body supported straps.

Figure 5 is a plan view of Figure 4.

Figure 2:
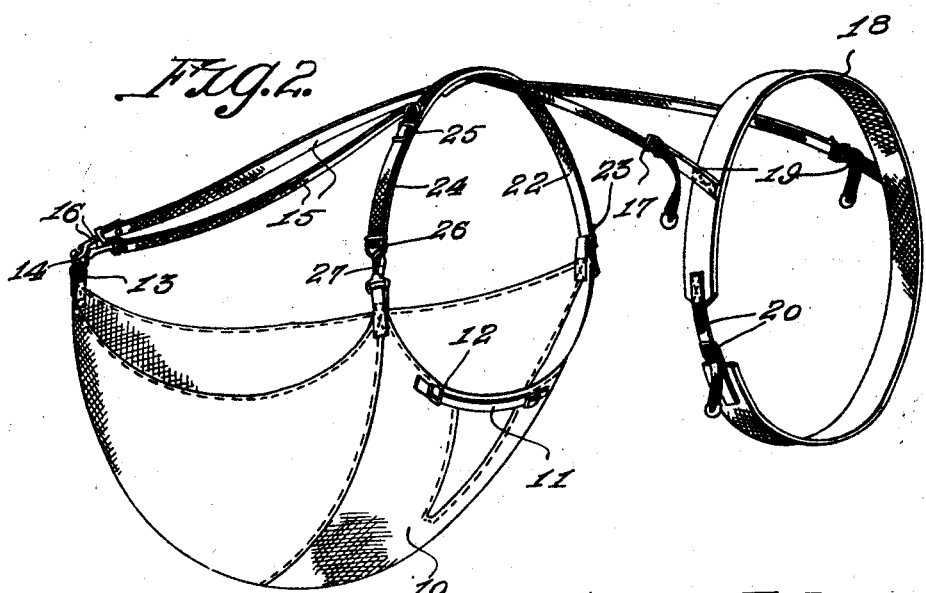
Figure 2 is a perspective view of the invention.

Referring to the drawings in detail 10 represents the protector which may be constructed from any suitable material, and shape as illustrated in Figure 2 to accommodate itself to the particular use intended. This protector is provided with a strap 11 adjustable by means of a buckle 12, so that the protector can be caused to fit nicely around the udder, to completely cover the latter, with a view of keeping it warm in cold weather, and at the same time protect the udder from being scratched, or bitten by flies or other insects which frequently carry infections and disease into the milk ducts.

Figure 1:
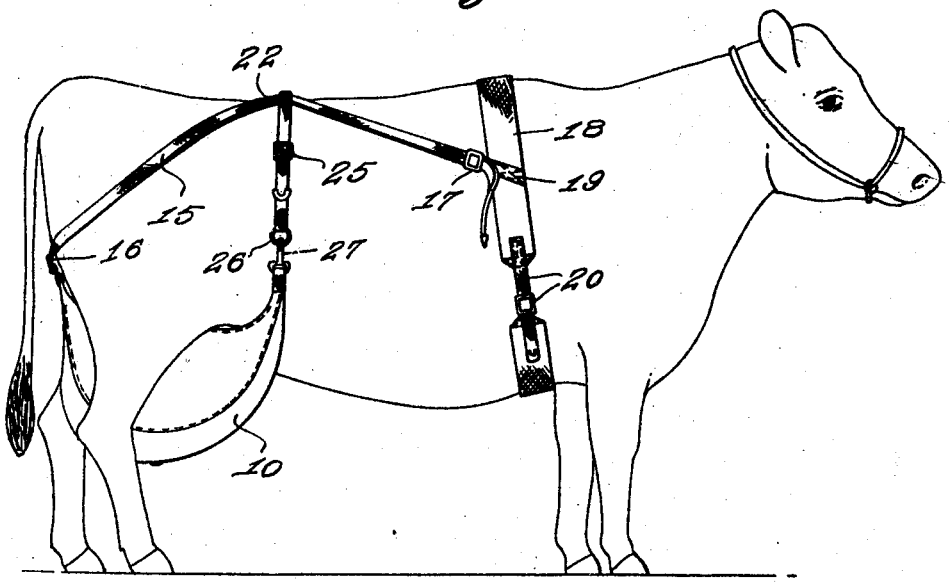
Figure 1 is a view showing the application of the invention.

The protector is supported for use in the manner shown in Figures 1 and 2, wherein it will be noted that at the rear end, the protector is provided with a looped extension 13 which supports a ring 14, and the adjacent ends of a pair of straps 15 are connected to said ring by snap hooks or the like 16. The straps 15 extend from the ring 14 at the opposite sides of the animal as shown in Figure 1, these straps being crossed where they intersect each other on the back of the animal, and have their forward extremities adjustably connected by means of buckles 17 with a body encircling band 18. The buckles 17 are of course carried by short strap extensions 19 attached to the band 18, the band having its ends adjustably connected together by a strap and buckle indicated generally at 20 in Figure 2.

The straps 15 at their point of intersection pass through a loop 21 formed on the strap 22 adapted to be supported on the back of the animal, and one end of which strap 22 is adjustably connected by a buckle 23 with the adjacent corner of the protector 10. The other end of this strap is looped upon itself as at 24, and its free end adjustably connected with a buckle 25. The looped end 24 is provided with a ring 26 adapted to be engaged by a snap hook 27 carried by the adjacent corner of the protector 10. The loop 21 above mentioned is formed by an auxiliary strap 28 secured at its ends to the under side of the strap 22 above mentioned and clearly shown in Figure 4. By reason of this construction it is clear that the straps 15 can slide relatively through the loop 21, incident to the movements of the body of the animal, so that the latter can have perfect freedom of movement without subjecting the straps for the protector 10 to undue strains and pulls.

It is manifest that I have provided an udder protector which is extremely simple in construction, and capable of being adjusted with ease, accommodate itself to the cow's movements, and thereby maintained in proper position better than heretofore.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In combination, an udder protector, harness supporting means for said protector, said means including a body encircling band, straps connected to the opposite sides of the band and also connected at a common point with one end of the protector, a body strap terminally connected with the adjacent corners of the protector, and said first mentioned straps intersecting each other and capable of sliding movement with relation to each other and said body strap.

2. In combination, an udder protector, harness supporting means therefor including an adjustable body encircling band, straps terminally connected to the band at opposite points, said straps having their other extremities connected to the rear end of the protector, said straps extending in opposite directions and intersecting each other on the back of the animal, a body supported strap having both ends adjustably connected with the adjacent corners of the protector at opposite sides of the animal, and a loop formed in said last mentioned strap through which the first mentioned straps pass at their point of intersection, and capable of relative sliding movements therethrough for the purpose specified.

In testimony whereof I affix my signature.

CAROLYN T. JENKINS.